(12) United States Patent
Koch et al.

(10) Patent No.: US 8,997,445 B2
(45) Date of Patent: Apr. 7, 2015

(54) SHIELD APPARATUS FOR AGRICULTURAL IMPLEMENT HEADER

(76) Inventors: Karl Victor Koch, Marsden (CA); Victor Demetrius Koch, Marsden (CA)

(*) Notice: Subject to any disclaimer, the term of this patent is extended or adjusted under 35 U.S.C. 154(b) by 526 days.

(21) Appl. No.: 13/313,639

(22) Filed: Dec. 7, 2011

(65) Prior Publication Data

US 2012/0311987 A1    Dec. 13, 2012

Related U.S. Application Data

(60) Provisional application No. 61/496,203, filed on Jun. 13, 2011.

(51) Int. Cl.
*A01D 34/00* (2006.01)
*A01D 41/14* (2006.01)
*A01D 57/26* (2006.01)
*A01D 75/18* (2006.01)

(52) U.S. Cl.
CPC ............... *A01D 41/14* (2013.01); *A01D 75/18* (2013.01); *A01D 57/26* (2013.01)

(58) Field of Classification Search
USPC ......... 56/229, 207, 122, 1, 364, 320.1, 320.2, 56/14.5, 17.4, 190, DIG. 20, DIG. 24
See application file for complete search history.

(56) References Cited

U.S. PATENT DOCUMENTS

| | | | | | |
|---|---|---|---|---|---|
| 2,526,141 | A | * | 10/1950 | Knowiton | 56/364 |
| 2,774,210 | A | * | 12/1956 | Kay | 198/522 |
| 3,109,273 | A | * | 11/1963 | Soldner | 56/190 |
| 3,224,177 | A | * | 12/1965 | Adee | 56/153 |
| 3,913,247 | A | * | 10/1975 | Ruhl | 37/258 |
| 4,085,570 | A | * | 4/1978 | Joray et al. | 56/2 |
| 4,147,016 | A | * | 4/1979 | Jensen et al. | 56/15.8 |
| 4,190,973 | A | * | 3/1980 | Schmidt | 37/262 |
| 4,539,798 | A | * | 9/1985 | Klinner | 56/16.4 R |
| 5,111,645 | A | * | 5/1992 | Klinner | 56/364 |
| 5,557,912 | A | * | 9/1996 | Voss et al. | 56/130 |

* cited by examiner

*Primary Examiner* — Thomas B Will
*Assistant Examiner* — Mai Nguyen
(74) *Attorney, Agent, or Firm* — Ryan W. Dupuis; Kyle R. Satterthwait; Ade & Company Inc.

(57) ABSTRACT

A shield apparatus is mounted on the header of an agricultural implement which includes a rotatable collecting member to direct collected material rearwardly towards a rear discharge opening. The shield apparatus includes a panel member and a mounting bracket assembly which supports the panel member above the rear discharge opening of the header spanning in a lateral direction transversely to the forward working direction such that the panel member extends from a rear edge rearward of the collecting member to a front edge which is spaced forward and upwardly in relation to the rear edge. The shield apparatus ensures that material thrown upwardly above the rear of the header frame is redirected downwardly into the rear discharge opening of the header for collection by the implement in the usual manner. The shield apparatus does not interfere with the visibility of the operator when the panel member is clear.

17 Claims, 7 Drawing Sheets

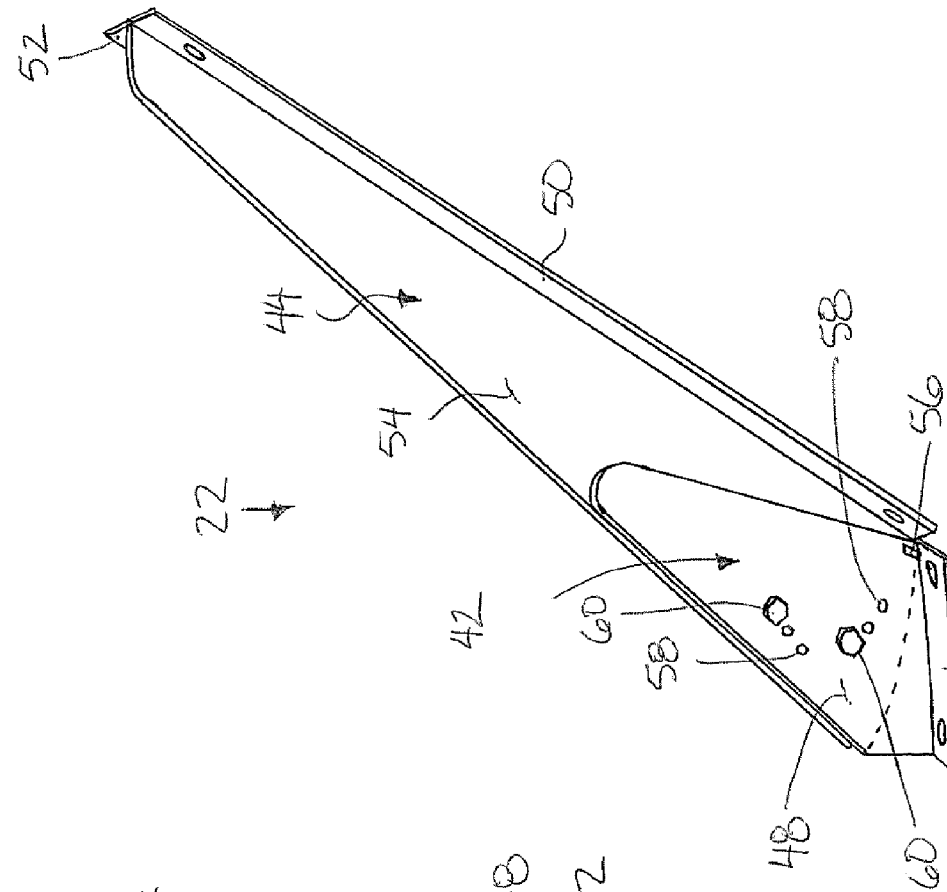
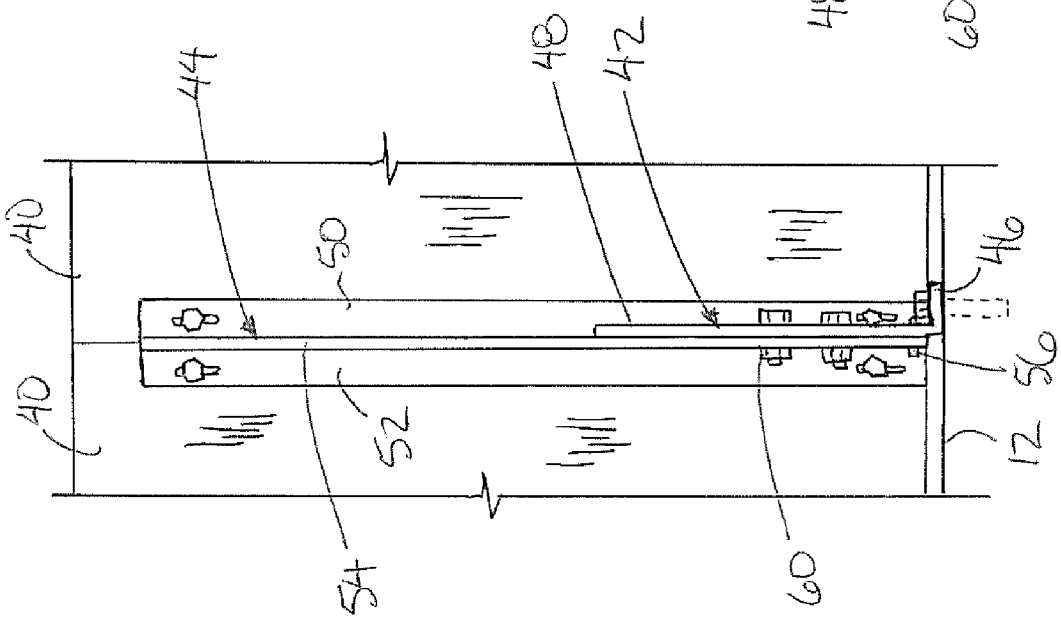

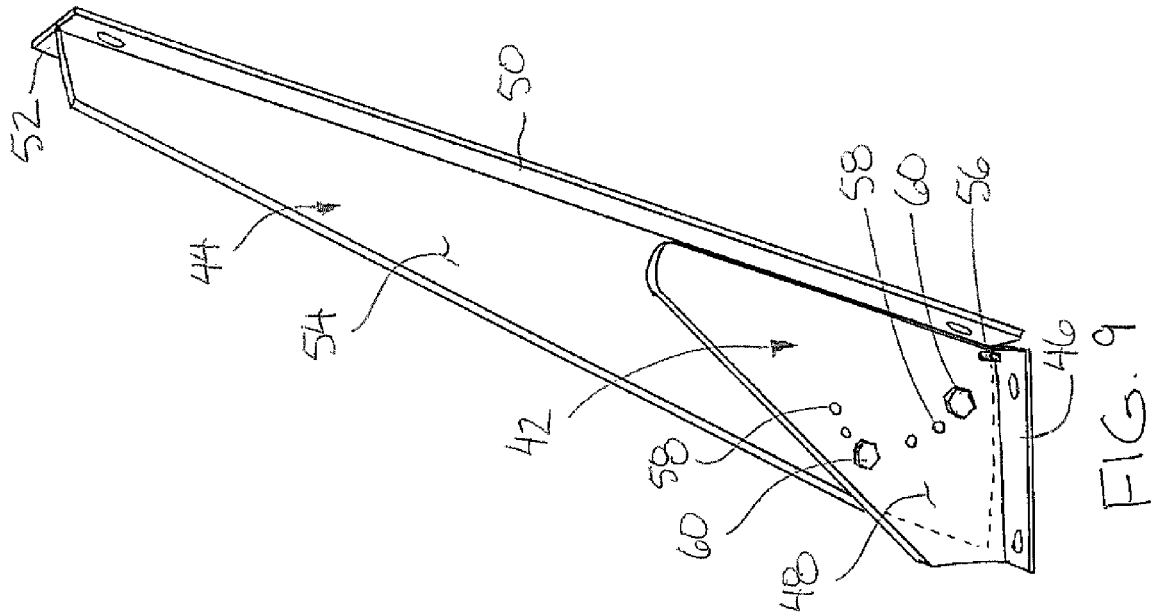
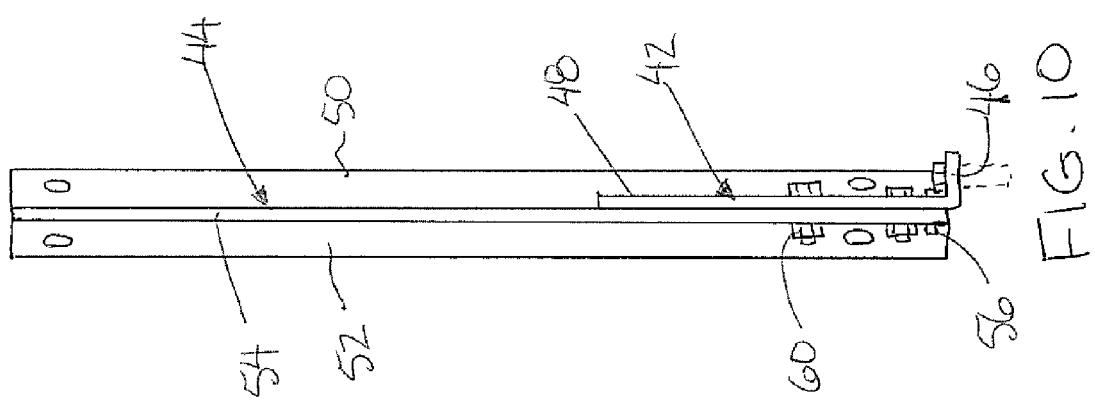

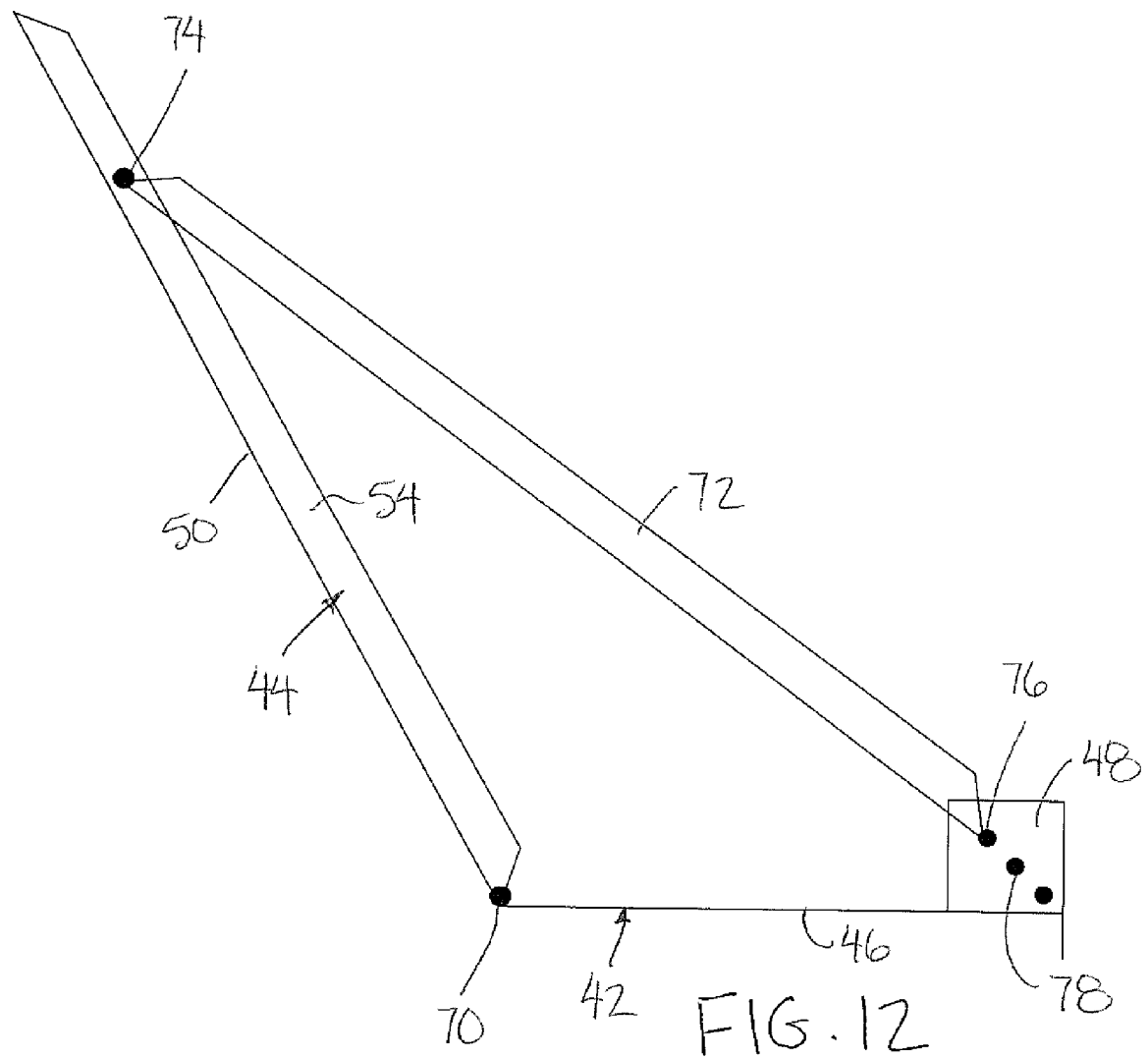

SHIELD APPARATUS FOR AGRICULTURAL IMPLEMENT HEADER

This application claims the benefit under 35 U.S.C. 119(e) of U.S. provisional application Ser. No. 61/496,203, filed Jun. 13, 2011.

FIELD OF THE INVENTION

The present invention relates to a shield apparatus which extends upwardly and forwardly from a rear of a header frame of an agricultural implement header to direct material thrown upwardly by the rotating collecting member of header downwardly and inwardly towards a rear discharge opening of the header.

BACKGROUND

A common construction of a header for an agricultural implement includes either a cutter bar with a pickup reel and/or a rotating tine pickup belt for feeding material to an auger which collects the material into a rear discharge of the header. In certain types of crops, material can be thrown upward onto the frame of the header above the rear discharge opening. The material can then obstruct the view of the operator of the implement, or become entangled in the implement, or be wasted by being thrown onto the ground instead of being collected in the usual manner of the implement.

SUMMARY OF THE INVENTION

According to one aspect of the invention there is provided a shield apparatus in combination with a header of an agricultural implement arranged for movement across the ground in a forward working direction in which the header comprises a header frame arranged to be supported on the agricultural implement and at least one collecting member rotatably supported on the header frame so as to be arranged to direct collected material rearwardly towards a rear discharge opening laterally centered on the header, the shield apparatus comprising:

a mounting bracket assembly mounted onto the header frame; and a panel member coupled to the mounting bracket assembly such that the panel member is supported above the rear discharge opening of the header spanning in a lateral direction transversely to the forward working direction;

the panel member being oriented to extend from a rear edge which is positioned rearwardly of the collecting member to a front edge which is spaced forwardly and upwardly in relation to the rear edge.

The shield apparatus ensures that material thrown upwardly over the rear of the header frame is redirected downwardly into the rear discharge opening of the header for collection by the implement in the usual manner. By forming the panel member of a translucent or transparent material, the shield apparatus does not interfere with the visibility of the operator of the implement.

Preferably he mounting bracket assembly is arranged to support the front edge of the panel member at a greater height than the collecting member of the header.

Preferably the mounting bracket assembly is arranged to support the panel member so as to be substantially centered in a lateral direction which is perpendicular to the forward working direction.

Preferably the mounting bracket assembly includes mounting apertures formed therein so as to be arranged to be mounted onto the header frame using threaded fasteners such that the panel member is readily separable from the header.

Preferably the panel member has a length in a lateral direction which is perpendicular to the forward working direction which is arranged to be longer than the rear discharge opening of the header.

In one embodiment, the mounting bracket assembly is arranged to support the panel member at a fixed inclination relative to the header frame.

Alternatively the mounting bracket assembly may be arranged to support the panel member at an upward and forward inclination within a range of 40 to 80 degrees from horizontal, and more preferably within a range of 50 to 70 degrees from horizontal.

The shield apparatus may be used in combination with a pickup header including a rotating tine pickup member forward of the collecting member and the collecting member comprises an auger for directing the material into the rear discharge opening.

Alternatively the shield apparatus may be used in combination with a straight cut header including a cutter bar forward of the collecting member and the collecting member comprises an auger for directing the material into the rear discharge opening.

Preferably the mounting bracket assembly comprises a plurality of bracket members arranged to be independently coupled to the header frame at spaced apart positions in the lateral direction which is perpendicular to the forward working direction.

In one embodiment each bracket member comprises a single sheet metal member including a main panel portion, a first mounting flange along one edge of the main panel arranged to be fastened to the panel member and a second mounting flange along another edge of the main panel arranged to be fastened to the header frame.

In another embodiment each bracket member comprises:

a base portion including a base mounting flange fastened to the header frame and an upright pivot plate connected to the base mounting flange so as to be oriented substantially parallel to the forward working direction;

a panel portion including a panel mounting flange fastened to the panel member and an upright pivot plate connected to the panel mounting flange so as to be oriented parallel and adjacent to the upright pivot plate of the base portion;

the upright pivot plates of the base portion and the panel portion including cooperating apertures formed therein which are arranged to be aligned with one another at different angular orientations of the panel member relative to the header; and at least one fastening member arranged to be received through the cooperating apertures at the different angular orientations so as to be arranged to selectively fix the panel member at a selected one of the different angular orientations relative to the header.

Preferably the cooperating apertures are arranged to be aligned at a plurality of different angular orientations of the panel member within a range of 40 to 80 degrees from horizontal, and more preferably within a range of 50 to 70 degrees from horizontal.

Alternatively, each bracket member may comprise:

a base portion including a base mounting flange fastened to the header frame;

a panel portion including a panel mounting flange fastened to the panel member, the panel portion being hinged to the base portion for relative pivotal movement about a common horizontal pivot axis of the panel member relative to the header; and an anchor member arranged to be selectively anchored to both the base portion and the panel portion at respective locations spaced from the pivot axis at any one of a plurality of different angular orientations of the panel portion relative to the base portion corresponding to different angular orientations of the panel member relative to the header.

Preferably the anchor member is arranged to be fixedly mounted to the base portion and the panel portion at a plurality of different angular orientations of the panel member within a range of 40 to 80 degrees from horizontal, and more preferably within a range of 50 to 70 degrees from horizontal.

When the panel member comprises a plurality of panel sections supported in series with one another in the lateral direction, preferably there is provided one of the bracket members supported at a junction of each adjacent pair of panel sections such that the bracket member includes a base mounting portion fastened to the header frame, a first panel mounting portion fastened to a first one of the adjacent pair of panel sections and a second panel mounting portion fastened to a second one of the adjacent pair of panel sections.

According to a further aspect of the present invention there is provided a shield apparatus in combination with a header of an agricultural implement arranged for movement across the ground in a forward working direction in which the header comprises a header frame arranged to be supported on the agricultural implement and at least one collecting member rotatably supported on the header frame so as to be arranged to direct collected material rearwardly towards a rear discharge opening laterally centered on the header, the shield apparatus comprising:

a mounting bracket assembly mounted onto the header frame;

the mounting bracket assembly comprising a plurality of bracket members coupled to the header frame at spaced apart positions in a lateral direction which is oriented transversely to the forward working direction; and a panel member coupled to the mounting bracket assembly such that the panel member is supported above the rear discharge opening of the header spanning in the lateral direction;

the panel member comprising a plurality of panel sections supported in series with one another in the lateral direction;

the panel member being oriented to extend from a rear edge which is positioned rearwardly of the collecting member to a front edge which is spaced forwardly and upwardly in relation to the rear edge;

one of the bracket members being supported at a junction of each adjacent pair of the panel sections, said at least one of the bracket members comprising:

a base mounting portion fastened to the header frame;

a first panel mounting portion fastened to one of the panel sections of the adjacent pair;

a second panel mounting portion fastened to the other one of the panel sections of the adjacent pair;

the first and second panel mounting portions being coupled for pivotal movement together with the panels about a common horizontal pivot axis of the panel member relative to the header between a plurality of different angular orientations of the panel member relative to the header; and at least one fastening member arranged to selectively fix the first and second panel mounting portions relative to the base mounting portion at a selected one of the different angular orientations of the panel member relative to the header.

Various embodiments of the invention will now be described in conjunction with the accompanying drawings in which:

BRIEF DESCRIPTION OF THE DRAWINGS

FIG. 7 is a side elevational view of one of the bracket members of the second embodiment in a first angular orientation of the panel member relative to the header.

FIG. 8 is a rear elevational view of the bracket member of FIG. 7 shown in the first angular orientation.

FIG. 9 is a side elevational view of the bracket member of FIG. 7 shown in a second angular orientation of the panel member relative to the header.

FIG. 10 is a rear elevational view of the bracket member of FIG. 7 shown in the second angular orientation.

FIG. 12 is a side elevational view of a further embodiment of the shield apparatus.

In the drawings like characters of reference indicate corresponding parts in the different figures.

DETAILED DESCRIPTION

Figure 1:
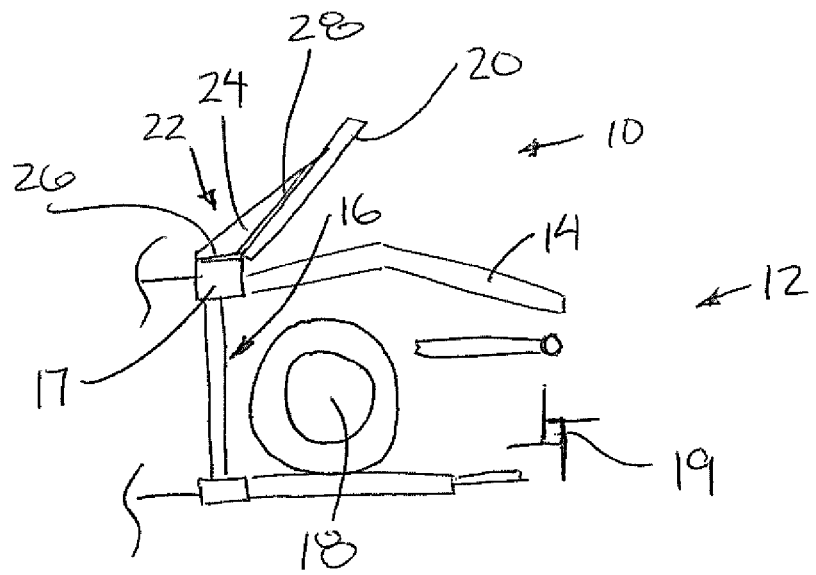
FIG. 1 is a side elevational view of the shield apparatus supported on a pickup header.
Figure 2:
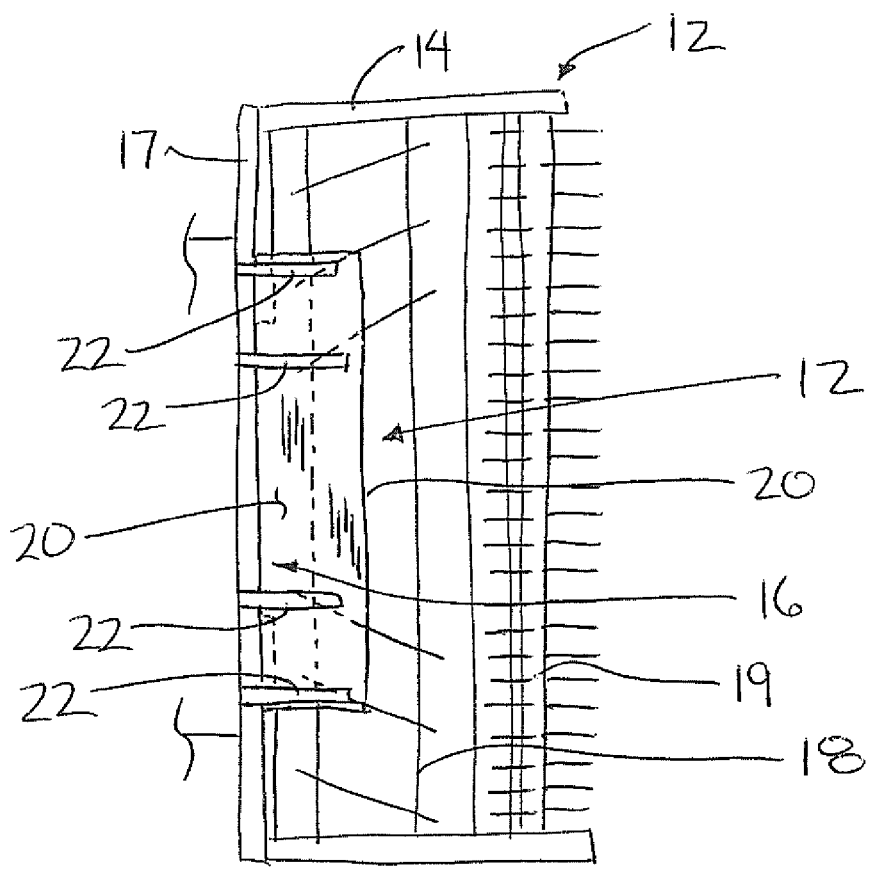
FIG. 2 is a top plan view of the shield apparatus supported on the pickup header of FIG. 1.
Figure 3:
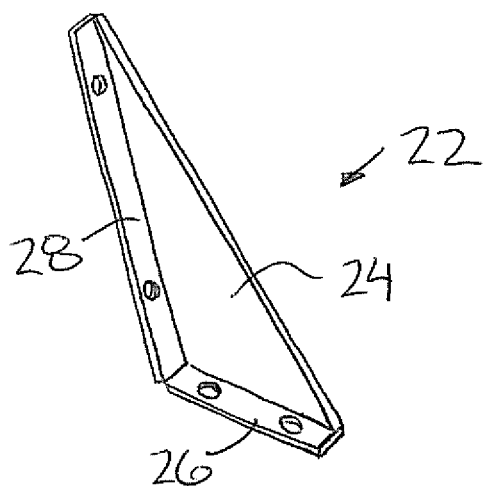
FIG. 3 is a perspective view of one of the bracket members.
Figure 4:
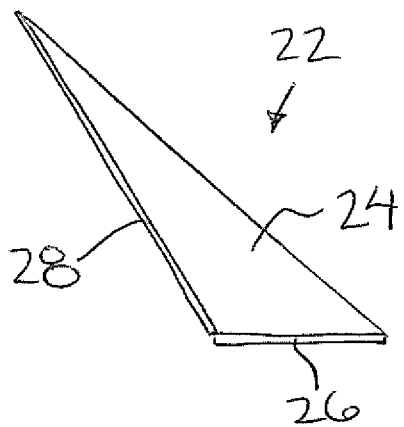
FIG. 4 is a side elevational view of the bracket member of FIG. 3.
Figure 5:
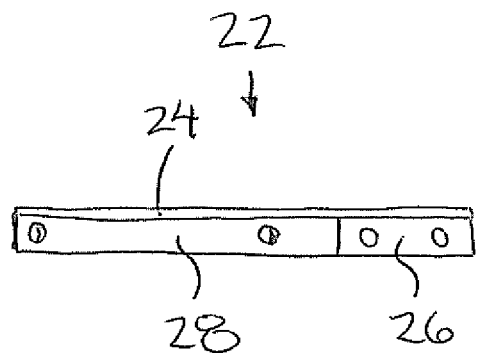
FIG. 5 is a top plan view of the bracket member of FIG. 3.
Figure 6:
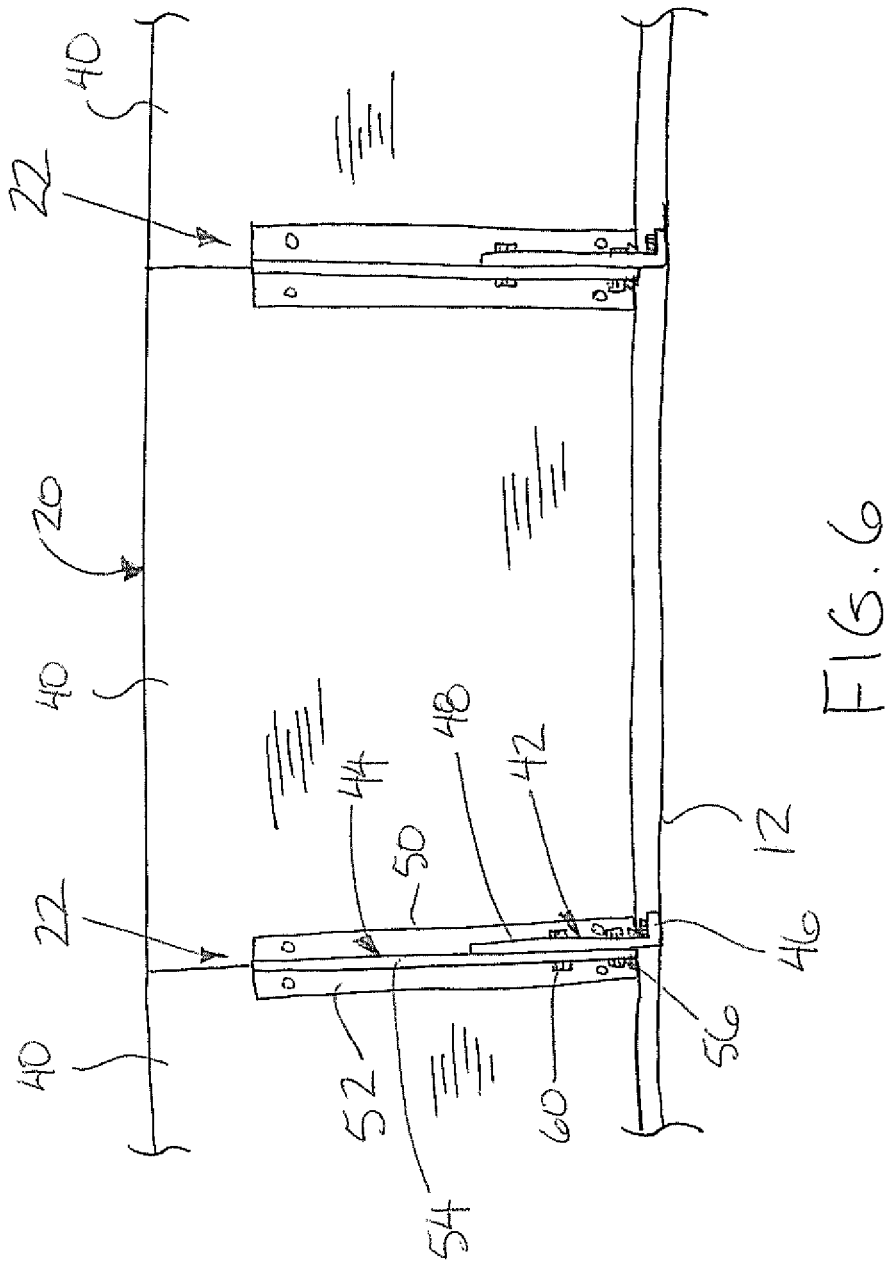
FIG. 6 is a rear elevational view of the shield apparatus according to a second embodiment.

Referring to the accompanying figures there is illustrated a shield apparatus generally indicated by reference numeral 10. The apparatus 10 is particularly suited for use with the header 12 of an agricultural implement, for example a harvester or the like, for movement therewith across the ground in a forward working direction.

The header 12 is attached to the front of the implement and typically comprises a header frame 14 having a rear discharge opening 16 laterally centered at the rear side thereof for communication with implement upon which the header is supported. An upper frame member 17 spans across the rear end of the header frame above the rear discharge opening. The header includes a collecting auger 18 which is rotatably supported on the header frame to direct collected material in the header rearwardly to the rear discharge opening.

In the illustrated embodiment, the header comprises a pick up header having a tine pickup member or reel 19 rotatably supported on the header frame spaced forwardly of the collecting auger for collecting material from the ground into the frame of the header for being subsequently directed by the collecting auger.

Alternatively, the header may comprise a straight-cut header including a cutter bar supported on the header frame supported forwardly of the collecting auger to cut the crop and collect the cut crop in the header frame for being subsequently directed by the collecting auger.

In either embodiment, the apparatus 10 generally comprises a rigid panel member 20 supported on the header frame by a bracket assembly comprises a plurality of bracket members 22 individually and independently supported on the header frame at spaced apart positions in a lateral direction across a rear of the header frame. The panel member shown in the figures is planar.

According to the first embodiment of FIGS. 1 through 5, each bracket member 22 is formed of a single sheet metal member which has been folded to define a triangular shaped main portion 24 having a first mounting flange 26 along one edge and a second mounting flange 28 along a second edge. The first mounting flanges 26 include fastener apertures receiving suitable fasteners therein such that the first mounting flanges are fastened to the top of the upper frame member 17 at the rear of the header frame in a releasable manner.

The bracket members are fastened such that the first mounting flanges lie in a horizontal plane across the top of the upper frame member 17 and such that the second mounting flanges lie in a common inclined plane locating the panel member 20 therein by fastening all of the second mounting flanges at respective laterally spaced apart positions on the panel member. The second mounting flanges and the panel member include co-operating apertures to receive threaded fasteners which couple the panel member to the respective mounting flanges.

The second mounting flanges are oriented at an inclination of near 40 degrees to the first mounting flanges such that the second mounting flanges and the panel member supported thereon extend forwardly at an upward inclination of near 50 degrees from horizontal in the illustrated embodiment. Typically the panel member is supported by the bracket members at an inclination in the range of 40 to 80 degrees, however other inclinations may be suitable.

The panel member of the first embodiment is formed of clear, rigid plastic material having dimensions of approximately 8 feet in length in the lateral direction across the header and a height of approximately 2 feet from a rear edge supported at the top of the upper frame member of the header to a front edge spaced upwardly and forwardly from the rear edge.

Although the length of the header may be in the range of 14 to 16 feet for example, providing a panel member of approximately 8 feet in length which is mounted by the bracket members to be laterally centered, ensures that the panel member fully spans across an area above the rear discharge opening. The brackets adequately support the panel member such that it extends upwardly and forwardly from the rear edge supported on the top of the header frame at the rear side rearward of the collecting auger to a top or forward end which is spaced above the header frame, above the collecting auger and forward of the rear edge.

Turning now to FIGS. 6 through 10, a second embodiment of the bracket members 22 are shown. In this instance, the panel member 20 is formed in 3 separate panel sections 40 which are supported in series with one another in the lateral direction. Typically, four bracket members 22 are provided in this instance such that one bracket member is located adjacent each of the opposing ends of the assembled panel member with the remaining intermediate bracket members each being located at a junction between a respective adjacent pair of panel sections 40 abutted end to end with one another.

The bracket members 22 in this embodiment each include a base portion 42 and a panel portion 44 which are coupled together for relative movement such that the angular orientation of the assembled panel member can be adjusted relative to the header when the base portion is mounted on the upper frame member of the header and the panel portion is mounted on the panel members.

More particularly, each base portion 42 includes a base mounting flange 46 in the form of a plate member locating mounting apertures therein to permit fasteners to selectively secure the base portion to the header frame. The base portion further includes an upright pivot plate 48 fixed integrally with the mounting flange 46 in a substantially perpendicular relationship such that the upright pivot plate is oriented substantially vertically and parallel to the forward working direction of the header when the base mounting flange 46 is mounted horizontally across the top of the upper frame member of the header.

The panel portion of each bracket member includes a first panel mounting flange portion 50 which joins to one panel section of the panel member. At least the two intermediate ones of the bracket members 22 further include a second panel mounting flange portion 52. Accordingly, when the mounting bracket is located at the junction between an adjacent pair of panel sections, one panel mounting flange portion joins to one panel section while the other joins to the other panel section at the junction of the adjacent pair of panel sections by providing mounting apertures in both flange portions receiving suitable fasteners therethrough. The fastener apertures may be somewhat elongated to provide some relative adjustment of the panel sections relative to the corresponding flange portions of the panel portion 44. In this instance, the bracket members provide the dual function of joining the panel sections in abutment with one another to form the assembled panel member while also supporting the panel member at an adjustable angular orientation as described in further detail below.

Each panel portion 44 also includes an upright pivot plate 54 oriented perpendicularly to the first and second panel mounting flange portions 50 and 52 while being centered therebetween in the lateral direction such that the flange portions projects laterally outward from opposing sides of the upright pivot plate 54.

The upright pivot plates 48 and 54 are mounted parallel and directly adjacent to one another within each bracket member 22 such that the overlapping pivot plates are parallel to the forward working direction. A pivot pin 56 is coupled through cooperating apertures in the upright pivot plates to define a common horizontal axis extending through all of the bracket members in the lateral direction about which the panel member is pivotal relative to the header by permitting the panel portions of the mounting brackets to be pivotal relative to the respective base portions. The panel member is thus adjustable between a plurality of different angular orientations relative to the header.

The upright pivot plates also include two sets of cooperating apertures therein in which the cooperating apertures 58 are arranged to align with corresponding apertures in the other upright pivot plate adjacent thereto at a corresponding one of the different angular orientations of the panel member relative to the header. At each angular orientation, a suitable fastening member 60 is arranged to be received through the cooperating apertures to selectively fix the adjacent upright pivot plates relative to one another which in turn fixes the panel member relative to the header. In the illustrated embodiment the two sets of cooperating apertures 58 in both upright plates correspond to three different angular orientations, for example 50 degrees, 60 degrees and 70 degrees from horizontal when the three different angular orientations are at equidistant intervals between 40 and 80 degrees. The two separate sets of cooperating apertures permit a fastener to be received through one corresponding aligned pair of apertures within each set for fixing the two upright pivot plates relative to one another at two spaced apart locations to adequately fix the panel member relative to the header at the selected orientation.

In the illustrated embodiment, both the upright pivot plates are generally triangular in shape and are further arranged such that the rear edges of both upright plates are aligned with one another in the lowest position of the panel member shown in FIG. 7 corresponding to the most horizontal position among the different angular orientations. Furthermore, the forward edges of both plate members are arranged to be aligned with one another in the most raised position in which the angular orientation is nearest to vertical as shown in FIG. 9.

In further embodiments, the fastening member 60 may comprise any suitable pin, bolt or clamp member which is arranged to selectively fix the two upright pivot plates 48 and 54 relative to one another about the pivot pin 56. In yet further embodiments, no pivot pin 56 is required to restrict the relative movement between the two upright pivot plates to a pivotal motion about a single axis when multiple sets of cooperating apertures are provided.

Figure 11:
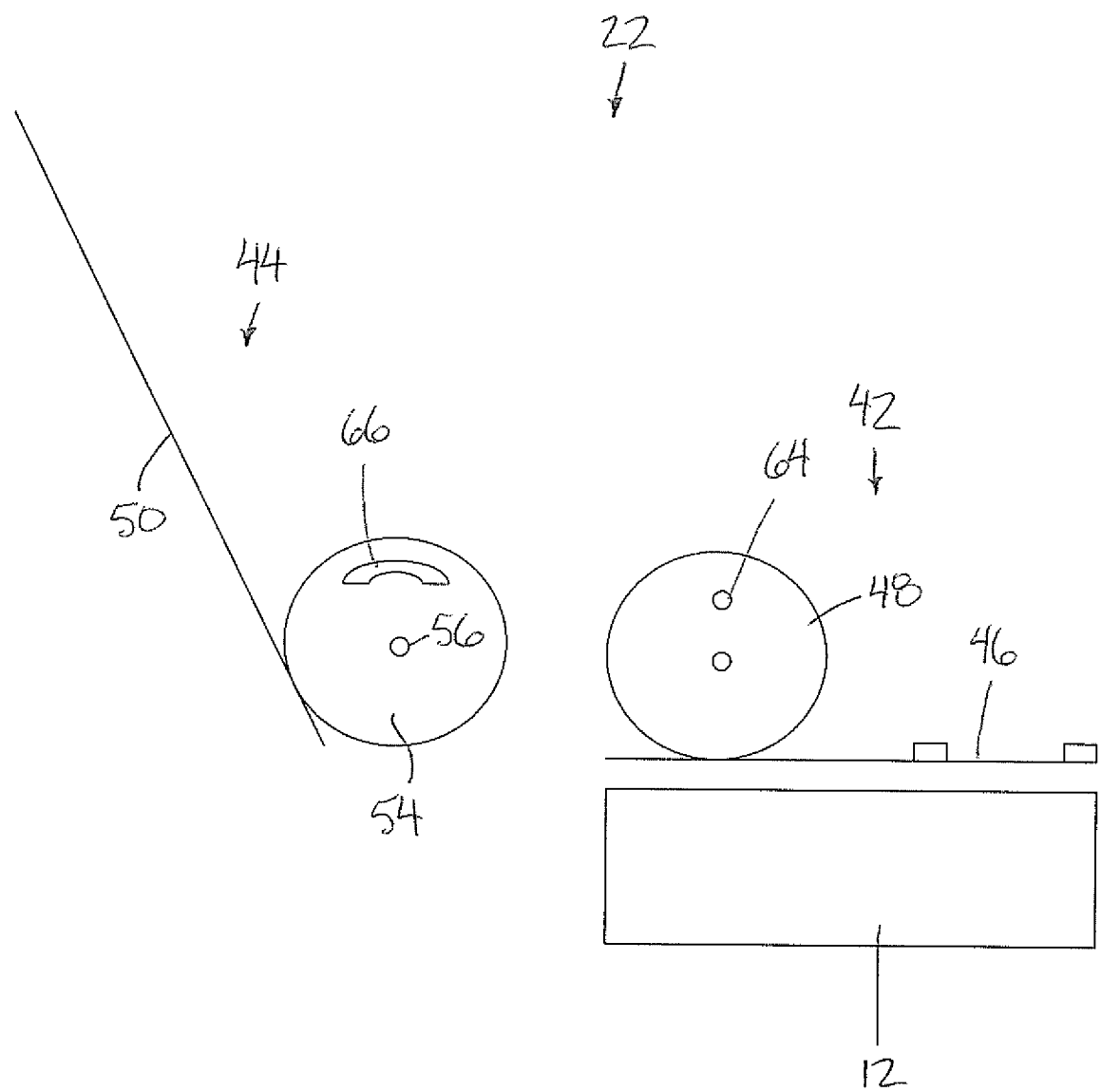
FIG. 11 is an exploded side elevational view of a further embodiment of the shield apparatus.

Turning now to FIG. 11, a further embodiment of the mounting brackets 22 is schematically represented. In this instance, the mounting bracket 22 is substantially identical to the previous embodiment with the exception of the upright pivot plates 48 and 54 being generally circular about the pivot pin 56. Furthermore, the cooperating apertures 58 in this instance comprise only a single aperture in one of the upright plates, that is the upright pivot plate 48 of the base portion in the illustrated embodiment, while the other upright pivot plate 54 defines the cooperating aperture as a single arcuate shaped slot of constant radius from the pivot pin. Accordingly the single aperture 64 remains aligned with the arcuate slot 66 throughout the full range of pivotal movement of the panel member relative to the header between the different angular orientations thereof.

In this instance, a suitable fastener 60 can remain secured within the single aperture 64 with only some loosening required to permit sliding of the fastener along the arcuate slot 66 to perform the angular adjustment. Tightening the fastener at the selected position frictionally clamps the two upright pivot plates together to again selectively restrict the angular orientation of the panel member at one selected orientation among a plurality of different angular orientations possible. The opposing ends of the arcuate slot define the opposing ends of the range of different angular orientations. The fastener 60 may also be replaced with any suitable clamp or bolt type fastener which permits sufficient frictional clamping force to be applied while remaining readily releasable for adjustment as desired.

Turning now to FIG. 12, according to a further embodiment of the bracket members, there may similarly be provided a base portion 42 including a base mounting flange 46 for fastening to the header frame as described above. Also, the panel portion 44 in this instance includes a similar first and/or second panel mounting flange portion 50/52 for fastening to the panel sections of the panel member. Also as in the previous embodiment, the panel portion includes an upright plate 54 integrally fixed therewith while the base portion mounting flange 46 includes an upright plate 48 integrally fixed therewith. The base mounting flange 46 and the mounting flange portions 50 and 52 in this instance however are directly coupled by a hinge 70 which defines the common horizontal pivot axis extending in the lateral direction about which the panel member is pivotal relative to the header.

The upright plates 48 and 54 in this instance instead define anchor plates rather than pivot plates which are arranged to lie spaced apart in a substantially common plane for fastening to opposing ends of an anchor member 72. The anchor member is pivotally connected at a first end 74 to the anchor plate of the panel portion at a location spaced radially outward from the pivot axis. Similarly, the opposing second end 76 of the anchor member is arranged to be fastened to the upright anchor plate of the base portion 42 also radially spaced from the pivot axis so that the anchor member, the base portion, and the panel portion form a generally triangular configuration which fixes the orientation of the panel member relative to the header. The anchor plate of the base portion 42 however includes a plurality of anchor apertures 76 at spaced apart positions so that the second end 76 of the anchor member is anchored at different positions relative to the base portion corresponding to different angular orientations of the panel member relative to the header. Suitable fasteners fix the opposing ends of the anchor member to the base portion and panel portion respectively to selectively fix the panel portion relative to the base portion at the selected orientation. Typically, the range of desired angular orientations is consistent among the different embodiments.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A shield apparatus in combination with a header of an agricultural implement arranged for movement across the ground in a forward working direction in which the header comprises a header frame arranged to be supported on the agricultural implement and at least one collecting member rotatably supported on the header frame so as to be arranged to direct collected material rearwardly towards a rear discharge opening laterally centered on the header, the shield apparatus comprising:

a mounting bracket assembly mounted onto the header frame; and a panel member coupled to the mounting bracket assembly such that the panel member is supported above the rear discharge opening of the header spanning in a lateral direction transversely to the forward working direction;

the panel member being oriented to extend from a rear edge which is positioned rearwardly of the collecting member to a front edge which is spaced forwardly and upwardly in relation to the rear edge;

wherein the mounting bracket assembly comprises a plurality of bracket members arranged to be independently coupled to the header frame at spaced apart positions in the lateral direction which is perpendicular to the forward working direction; and wherein each bracket member comprises:

a base portion including a base mounting flange fastened to the header frame and an upright pivot plate connected to the base mounting flange so as to be oriented substantially parallel to the forward working direction;

a panel portion including a panel mounting flange fastened to the panel member and an upright pivot plate connected to the panel mounting flange so as to be oriented parallel and adjacent to the upright pivot plate of the base portion;

the upright pivot plates of the base portion and the panel portion including cooperating apertures formed therein which are arranged to be aligned with one another at different angular orientations of the panel member relative to the header; and at least one fastening member arranged to be received through the cooperating apertures at the different angular orientations so as to be arranged to selectively fix the panel member at a selected one of the different angular orientations relative to the header.

2. The shield apparatus according to claim 1 wherein the cooperating apertures are arranged to be aligned at a plurality of different angular orientations of the panel member within a range of 40 to 80 degrees from horizontal.

3. The shield apparatus according to claim 1 wherein the cooperating apertures are arranged to be aligned at a plurality of different angular orientations of the panel member within a range of 50 to 70 degrees from horizontal.

4. A shield apparatus in combination with a header of an agricultural implement arranged for movement across the ground in a forward working direction in which the header comprises a header frame arranged to be supported on the agricultural implement and at least one collecting member rotatably supported on the header frame so as to be arranged to direct collected material rearwardly towards a rear discharge opening laterally centered on the header, the shield apparatus comprising:
   a mounting bracket assembly mounted onto the header frame; and
   a panel member coupled to the mounting bracket assembly such that the panel member is supported above the rear discharge opening of the header spanning in a lateral direction transversely to the forward working direction;
   the panel member being oriented to extend from a rear edge which is positioned rearwardly of the collecting member to a front edge which is spaced forwardly and upwardly in relation to the rear edge;
   wherein the mounting bracket assembly comprises a plurality of bracket members arranged to be independently coupled to the header frame at spaced apart positions in the lateral direction which is perpendicular to the forward working direction; and
   wherein each bracket member comprises:
      a base portion including a base mounting flange fastened to the header frame;
      a panel portion including a panel mounting flange fastened to the panel member, the panel portion being hinged to the base portion for relative pivotal movement about a common horizontal pivot axis of the panel member relative to the header; and
      an anchor member arranged to be selectively anchored to both the base portion and the panel portion at respective locations spaced from the pivot axis at any one of a plurality of different angular orientations of the panel portion relative to the base portion corresponding to different angular orientations of the panel member relative to the header.

5. The shield apparatus according to claim 4 wherein the anchor member is arranged to be fixedly mounted to the base portion and the panel portion at a plurality of different angular orientations of the panel member within a range of 50 to 70 degrees from horizontal.

6. The shield apparatus according to claim 4 wherein the panel member comprises a transparent material.

7. The shield apparatus according to claim 4 wherein the mounting bracket assembly is arranged to support the front edge of the panel member at a greater height than the collecting member of the header.

8. The shield apparatus according to claim 4 wherein the mounting bracket assembly is arranged to support the panel member at a fixed inclination relative to the header frame.

9. The shield apparatus according to claim 4 wherein the mounting bracket assembly is arranged to support the panel member so as to be substantially centered in a lateral direction which is perpendicular to the forward working direction.

10. The shield apparatus according to claim 4 wherein the mounting bracket assembly includes mounting apertures formed therein so as to be arranged to be mounted onto the header frame using threaded fasteners such that the panel member is readily separable from the header.

11. The shield apparatus according to claim 4 wherein the panel member has a length in a lateral direction which is perpendicular to the forward working direction which is arranged to be longer than the rear discharge opening of the header.

12. The shield apparatus according to claim 4 wherein the mounting bracket assembly is arranged to support the panel member at an upward and forward inclination within a range of 40 to 80 degrees from horizontal.

13. The shield apparatus according to claim 4 in combination with the header in which the header comprises a pickup header including a rotating tine pickup member forward of the collecting member and the collecting member comprises an auger for directing the material into the rear discharge opening.

14. The shield apparatus according to claim 4 in combination with the header in which the header comprises a straight cut header including a cutter bar forward of the collecting member and the collecting member comprises an auger for directing the material into the rear discharge opening.

15. The shield apparatus according to claim 4 wherein each bracket member comprises a single sheet metal member including a main panel portion, a first mounting flange along one edge of the main panel arranged to be fastened to the panel member and a second mounting flange along another edge of the main panel arranged to be fastened to the header frame.

16. A shield apparatus in combination with a header of an agricultural implement arranged for movement across the ground in a forward working direction in which the header comprises a header frame arranged to be supported on the agricultural implement and at least one collecting member rotatably supported on the header frame so as to be arranged to direct collected material rearwardly towards a rear discharge opening laterally centered on the header, the shield apparatus comprising:
   a mounting bracket assembly mounted onto the header frame; and
   a panel member coupled to the mounting bracket assembly such that the panel member is supported above the rear discharge opening of the header spanning in a lateral direction transversely to the forward working direction;
   the panel member being oriented to extend from a rear edge which is positioned rearwardly of the collecting member to a front edge which is spaced forwardly and upwardly in relation to the rear edge;
   wherein the mounting bracket assembly comprises a plurality of bracket members arranged to be independently coupled to the header frame at spaced apart positions in the lateral direction which is perpendicular to the forward working direction;
   wherein the panel member comprises a plurality of panel sections supported in series with one another in the lateral direction; and
   wherein there is provided one of the bracket members supported at a junction of each adjacent pair of panel sections such that the bracket member includes a base mounting portion fastened to the header frame, a first panel mounting portion fastened to a first one of the adjacent pair of panel sections and a second panel mounting portion fastened to a second one of the adjacent pair of panel sections.

17. A shield apparatus in combination with a header of an agricultural implement arranged for movement across the ground in a forward working direction in which the header comprises a header frame arranged to be supported on the agricultural implement and at least one collecting member rotatably supported on the header frame so as to be arranged to direct collected material rearwardly towards a rear discharge opening laterally centered on the header, the shield apparatus comprising:

- a mounting bracket assembly mounted onto the header frame;
- the mounting bracket assembly comprising a plurality of bracket members coupled to the header frame at spaced apart positions in a lateral direction which is oriented transversely to the forward working direction; and
- a panel member coupled to the mounting bracket assembly such that the panel member is supported above the rear discharge opening of the header spanning in the lateral direction;
- the panel member comprising a plurality of panel sections supported in series with one another in the lateral direction;
- the panel member being oriented to extend from a rear edge which is positioned rearwardly of the collecting member to a front edge which is spaced forwardly and upwardly in relation to the rear edge;
- one of the bracket members being supported at a junction of each adjacent pair of the panel sections, said at least one of the bracket members comprising:
  - a base mounting portion fastened to the header frame;
  - a first panel mounting portion fastened to one of the panel sections of the adjacent pair;
  - a second panel mounting portion fastened to the other one of the panel sections of the adjacent pair;
  - the first and second panel mounting portions being coupled for pivotal movement together with the panels about a common horizontal pivot axis of the panel member relative to the header between a plurality of different angular orientations of the panel member relative to the header; and
- at least one fastening member arranged to selectively fix the first and second panel mounting portions relative to the base mounting portion at a selected one of the different angular orientations of the panel member relative to the header.

* * * * *